US012801703B2

(12) United States Patent
Lin

(10) Patent No.: US 12,801,703 B2
(45) Date of Patent: Nov. 17, 2026

(54) APPLICATION AUTHORIZATION MANAGEMENT METHOD AND RELATED DEVICE

(71) Applicant: Beijing Wellintech Co., Ltd., Beijing (CN)

(72) Inventor: Wei Lin, Beijing (CN)

(73) Assignee: Beijing Wellintech Co., Ltd., Beijing (CN)

( * ) Notice: Subject to any disclaimer, the term of this patent is extended or adjusted under 35 U.S.C. 154(b) by 12 days.

(21) Appl. No.: 18/879,610

(22) PCT Filed: Jun. 29, 2023

(86) PCT No.: PCT/CN2023/103763
§ 371 (c)(1),
(2) Date: Dec. 27, 2024

(87) PCT Pub. No.: WO2024/002225
PCT Pub. Date: Jan. 4, 2024

(65) Prior Publication Data

US 2025/0390561 A1 Dec. 25, 2025

(30) Foreign Application Priority Data

Jun. 30, 2022 (CN) ......................... 202210772217.9

(51) Int. Cl.
*G06F 21/00* (2013.01)
*G06F 21/12* (2013.01)

(52) U.S. Cl.
CPC .................................. *G06F 21/121* (2013.01)

(58) Field of Classification Search
None
See application file for complete search history.

(56) References Cited

U.S. PATENT DOCUMENTS 7,805,755 B2 * 9/2010 Brown ................ G06F 21/6218 726/17
2006/0191016 A1 * 8/2006 Ostergren ........... G06F 21/1063 726/30

(Continued)

FOREIGN PATENT DOCUMENTS

CN 106897608 A 6/2017
CN 109657430 A 4/2019

(Continued)

OTHER PUBLICATIONS

Extended European Search Report; The Hague; Jun. 27, 2025; entire document.

(Continued)

*Primary Examiner* — Eleni A Shiferaw
*Assistant Examiner* — Hassan A Hussein
(74) *Attorney, Agent, or Firm* — Price Heneveld LLP

(57) ABSTRACT

The present disclosure relates to an application authorization management method, that includes: receiving an authorization request that is used to request an authorization permission of a second application downloaded from an application store, where the second application has an association relationship with a first application, and the second application is able to call the first application to implement a function of the first application; and in response to the authorization request, sending a first key and a second key; where the first application has a first authorization lock that is used to perform authorization locking on the first application, the second application has a second authorization lock that is used to perform the authorization locking on the second application, and the first key and the second key are used to release the authorization locking on the first application and the authorization locking on the second application, respectively.

18 Claims, 8 Drawing Sheets

(56) References Cited

U.S. PATENT DOCUMENTS

| | | | | |
|---|---|---|---|---|
| 2010/0306549 | A1* | 12/2010 | Ullmann | G07C 9/00857 713/185 |
| 2013/0185270 | A1* | 7/2013 | Brower | G06F 16/2343 707/704 |
| 2013/0247060 | A1* | 9/2013 | Makljenovic | G06F 9/526 718/104 |
| 2014/0055235 | A1* | 2/2014 | Choi | H04M 1/673 340/5.28 |
| 2016/0055241 | A1* | 2/2016 | Gower | H04L 67/60 707/770 |
| 2017/0288879 | A1* | 10/2017 | Quinlan | H04L 63/0815 |
| 2019/0236292 | A1* | 8/2019 | Bartolotta | G06F 8/65 |
| 2019/0340360 | A1* | 11/2019 | Kulkarni | G06F 21/51 |
| 2020/0092374 | A1* | 3/2020 | Mehta | G06F 11/0793 |
| 2020/0285761 | A1* | 9/2020 | Buck | G06F 21/51 |
| 2020/0401463 | A1* | 12/2020 | Weishaupt | G06F 9/526 |
| 2022/0207164 | A1* | 6/2022 | Liu | G06F 21/121 |
| 2022/0247787 | A1* | 8/2022 | Lippert | H04L 63/0892 |
| 2022/0391374 | A1* | 12/2022 | McKNIGHT | G06F 16/2343 |
| 2023/0025760 | A1* | 1/2023 | Nip | G06F 9/505 |
| 2023/0056500 | A1* | 2/2023 | Estep | G06F 9/526 |
| 2023/0085367 | A1* | 3/2023 | Zhang | H04L 63/108 726/4 |
| 2023/0116566 | A1* | 4/2023 | Kim | H04W 12/03 726/17 |
| 2023/0176846 | A1* | 6/2023 | Agarwalla | G06F 8/65 |
| 2024/0012677 | A1* | 1/2024 | Boderck | G06F 9/4806 |
| 2024/0152640 | A1* | 5/2024 | Rustagi | G06F 21/6218 |
| 2025/0383853 | A1* | 12/2025 | Lin | G06F 8/61 |
| 2026/0052435 | A1* | 2/2026 | Ramachandra | H04W 36/0079 |

FOREIGN PATENT DOCUMENTS

| | | | |
|---|---|---|---|
| CN | 107679373 | B | 9/2019 |
| CN | 110830468 | B | 4/2021 |
| CN | 109684790 | B | 6/2021 |
| CN | 112699342 | B | 7/2021 |
| CN | 114282193 | A | 4/2022 |
| CN | 113779522 | B | 7/2022 |
| CN | 111832005 | B | 9/2023 |
| CN | 115080928 | B | 7/2024 |
| JP | 2014023036 | A | 2/2014 |

OTHER PUBLICATIONS

China National Intellectual Property Administration; Notification of Grant of Invention Patent; Jul. 1, 2024; entire document.

China National Intellectual Property Administration; Notification of First Office Action; May 10, 2023; entire document.

China National Intellectual Propery Administration (ISA/CN); International Search Report; Oct. 9, 2023; entire document.

* cited by examiner

APPLICATION AUTHORIZATION MANAGEMENT METHOD AND RELATED DEVICE

CROSS-REFERENCE TO RELATED APPLICATION(S)

This application is a national phase entry under 35 USC 371 of International Patent Application No. PCT/CN2023/103763 filed on Jun. 29, 2023, the International Patent Application is filed based on Chinese Patent Application with the application Ser. No. 20/2210772217.9, filed on Jun. 30, 2022, and claims priority to the Chinese Patent Application, the entire contents of the International Patent Application and the Chinese Patent Application are incorporated herein by reference.

TECHNICAL FIELD

The present disclosure relates to the technical field of software, and in particular, to an application authorization management method and a related device.

BACKGROUND

An application program (application, APP), also known as an application, refers to a computer program for completing one or more specific works, which may run in a user mode and interact with users, and may have a visual user interface. An application developer may put a developed application on the shelf in an application store, and a user who needs to use an APP may download the APP from the application store.

Currently, when developing an application, the application developer may add an authorization lock for the application to perform authorization locking on the application. This authorization lock generally refers to an authorization encryption strategy implanted inside a program of the application. When using the application, users need to first purchase an authorization key of the application from the application store. The authorization key may be used to perform authorization unlocking on the authorization encryption strategy implanted inside the program of the application. Only after detecting the authorization key, the application may run normally and be used by users.

However, current application authorization locking methods all perform authorization locking on an application at the level of the entire application, and a whole application generally has only one authorization lock. In some scenarios, a whole application may contain multiple sub-applications, and for such a scenario, the existing application authorization management methods are not applicable, so that authorization locking on the whole application and each of sub-applications thereof cannot be implemented.

SUMMARY

The present disclosure provides an application authorization management method and a related device, which may implement authorization management of applications having an association relationship together. Technical solutions of the present disclosure are as follows.

In a first aspect, the present disclosure provides an application authorization management method, and the method includes: receiving an authorization request, where the authorization request is used to request an authorization permission of a second application downloaded from an application store, the second application has an association relationship with a first application, and the second application is able to call the first application to implement a function of the first application; in response to the authorization request, sending a first key and a second key.

In a second aspect, the present disclosure provides an application authorization management apparatus, and the apparatus includes: a receiving module, configured to receive an authorization request, where the authorization request is used to request an authorization permission of a second application downloaded from an application store, the second application has an association relationship with a first application, and the second application is able to call the first application to implement a function of the first application; and a sending module, configured to send a first key and a second key in response to the authorization request.

In a third aspect, the present disclosure provides an electronic device, and for example, the electronic device may be a hardware device corresponding to the application store described in the above first aspect. The electronic device includes: a processor and a memory for storing instructions executable by the processor; and the processor is configured to, when executing the instructions, cause the electronic device to implement the method of the first aspect and any implementation of the first aspect.

In a fourth aspect, the present disclosure provides a computer-readable storage medium on which computer program instructions are stored. The computer program instructions, when executed by an electronic device, cause the electronic device to implement the method of the first aspect and any implementation of the first aspect.

In a fifth aspect, the present disclosure provides a computer program product including computer-readable codes or a non-volatile computer-readable storage medium carrying computer-readable codes. The computer-readable codes are executed in an electronic device, and a processor in the electronic device implements the method of the first aspect and any implementation of the first aspect.

In a sixth aspect, the present disclosure provides an application authorization management method, and the method includes: sending an authorization request, where the authorization request is used to request an authorization permission of a second application downloaded from an application store, the second application has an association relationship with a first application, and the second application is able to call the first application to implement a function of the first application; and receiving a first key and a second key.

In a seventh aspect, the present disclosure provides an application authorization management apparatus, and the apparatus includes: a sending module, configured to send an authorization request, where the authorization request is used to request an authorization permission of a second application downloaded from an application store, the second application has an association relationship with a first application, and the second application is able to call the first application to implement a function of the first application; and a receiving module is configured to receive a first key and a second key.

In an eighth aspect, the present disclosure provides an electronic device, including: a processor and a memory for storing instructions executable by the processor; and the processor is configured to, when executing the instructions, cause the electronic device to implement the method of the sixth aspect and any implementation of the sixth aspect.

In a ninth aspect, the present disclosure provides a computer-readable storage medium on which computer program instructions are stored. The computer program instructions, when executed by an electronic device, cause the electronic device to implement the method of the sixth aspect and any implementation of the sixth aspect.

In a tenth aspect, the present disclosure provides a computer program product including computer-readable codes or a non-volatile computer-readable storage medium carrying computer-readable codes. The computer-readable codes are executed in an electronic device, and a processor in the electronic device implements the method of the sixth aspect and any implementation of the sixth aspect.

Based on any one of the first aspect to the tenth aspect above, the present disclosure has at least the following beneficial effects: the present disclosure may be applicable to a scenario in which a whole application contains multiple sub-applications (or referred to as a scenario in which a whole application is associated with multiple sub-applications). For a certain second application, if the second application has an association relationship with a first application and is able to call the first application to implement a function of the first application, the first application may be considered as a sub-application of the second application. The present disclosure may implement the authorization of the second application and the authorization of the first application respectively. The second application and the first application each have an authorization lock, for example, the first application has a first authorization lock, and the second application has a second authorization lock. When a user requests to acquire an authorization permission of the second application, the application store may package the authorization key (such as the second key) of the second application and the authorization key (such as the first key) of the first application together and distribute them to the user equipment, so as to achieve the authorization of the first application and the second application together.

It should be understood that the general description above and the detailed description below are only exemplary and explanatory, and cannot limit the present disclosure.

BRIEF DESCRIPTION OF THE DRAWINGS

The drawings here are incorporated into the specification and constitute a part of the specification, illustrate embodiments that conform to the present disclosure, are used together with the specification to explain principles of the present disclosure, and do not constitute improper limitations on the present disclosure.

DETAILED DESCRIPTION

Figure 1:
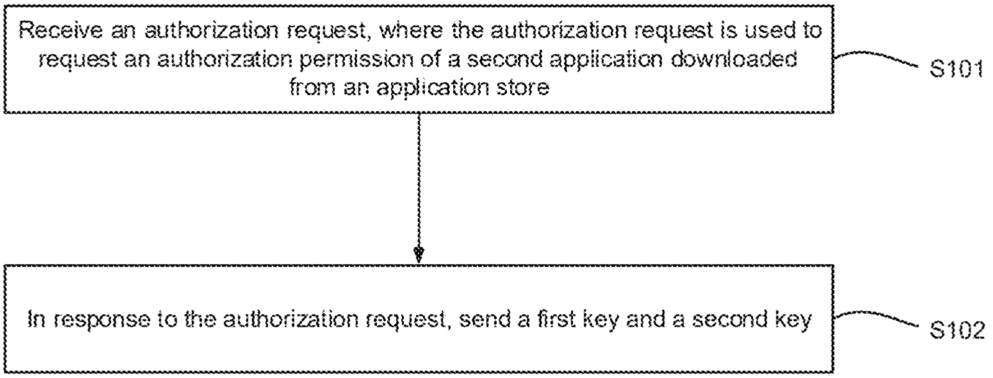
FIG. 1 is a schematic flow diagram of an application authorization management method provided by the embodiments of the present disclosure.

In order to make those ordinary in the art to better understand the technical solutions of the present disclosure, the technical solutions in the embodiments of the present disclosure will be described below clearly and completely in conjunction with the drawings.

It should be noted that the terms "first", "second", etc., in the specification and claims as well as the above drawings of the present disclosure are used to distinguish similar objects, but are not necessarily used to describe a specific order or sequence. It should also be understood that the term "comprise/comprising/comprised/include/including/included" indicates the presence of described features, integers, steps, operations, elements and/or components, but does not exclude the presence or addition of one or more other features, integers, steps, operations, elements and/or components.

An application program (application, APP), also referred to as an application, refers to a computer program for completing a certain or more specific works, which may run in a user mode and interact with a user, and may have a visual user interface.

An application developer may put a developed application on the shelf in an application store, and a user who needs to use an APP may download the APP from the application store. The application store may be implemented on a hardware device such as a server and a computer, etc., and may also provide users with an interactive application store interface, for users to download desired applications.

For example, in industry-related scenarios, an industrial Internet platform, namely the aforementioned application store, may be established based on hardware devices such as a server and a computer, etc. The application developer may put a developed application on the shelf in the industrial Internet platform, and a user who needs to use an application may download the application from the industrial Internet platform and use the application.

Currently, when developing an application, the application developer may add an authorization lock for the application to perform authorization locking on the application. This authorization lock generally refers to an authorization encryption strategy implanted inside a program of the application. When using the application, users need to first purchase an authorization key of the application from the application store. The authorization key may be used to perform authorization unlocking on the authorization encryption strategy implanted inside the program of the application. Only after detecting the authorization key, the application may run normally and be used by users.

However, current application authorization locking methods all perform authorization locking on an application at the level of the entire application, and a whole application generally has only one authorization lock. In some scenarios, a whole application may contain multiple sub-applications, and for such a scenario, the existing application authorization management methods are not applicable, so that authorization locking on the whole application and each of sub-applications thereof cannot be implemented.

In addition, since the current authorization lock generally refers to an authorization encryption strategy implanted inside the program of the application, it is inconvenient for the application developer to adjust the authorization encryption strategy after the application has been put on the shelf in the application store. If the authorization encryption strategy needs to be adjusted, the service logic of the application may be affected and the application needs to be re-put on the shelf.

Based on this, the embodiments of the present disclosure provide an application authorization management method, the method may be applicable to a scenario in which a whole application contains multiple sub-applications (or referred to as a scenario in which a whole application is associated with multiple sub-applications). For example, for a certain second application, if the second application has an association relationship with a first application and is able to call the first application to implement a function of the first application, the first application may be considered as a sub-application of the second application. This method may implement the authorization of the second application and the authorization of the first application respectively. The second application and the first application each have an authorization lock, for example, the first application has a first authorization lock, and the second application has a second authorization lock. When a user requests to acquire an authorization permission of the second application, the application store may package the authorization key (such as the second key) of the second application and the authorization key (such as the first key) of the first application together and distribute them to the user equipment, so as to achieve the authorization locking of the first application and the second application together.

In addition, in the application authorization management method provided by the embodiments of the present disclosure, the authorization lock of each application is independent of the program of the application, and is not an authorization encryption strategy implanted inside the program of the application. After the application has been put on the shelf in the application store, the authorization lock of the application may still be adjusted (such as canceled or changed). When the authorization lock is adjusted, the service logic of the application will not be affected, so that the functional stability of the application may be guaranteed.

Exemplarily, the method may specifically be implemented on a hardware device corresponding to the application store, for example, the hardware device may include a server, a computer, or the like. The server may be a separate server, or a server cluster composed of multiple servers. In some implementations, the server cluster may further be a distributed cluster. The present disclosure does not limit the specific implementation of the hardware device corresponding to the application store. It should be noted that the implementation steps at the application store side involved in the embodiments of the present disclosure may all be implemented by the hardware device corresponding to the application store.

FIG. 1 is a flow schematic diagram of an application authorization management method provided by the embodiments of the present disclosure. As shown in FIG. 1, the application authorization management method may include the following steps.

S101: receiving an authorization request, where the authorization request is used to request an authorization permission of a second application downloaded from an application store.

The second application has an association relationship with a first application, and the second application is able to call the first application to implement a function of the first application.

S102: in response to the authorization request, sending a first key and a second key.

Herein, the first application has a first authorization lock, the first authorization lock is used to perform authorization locking on the first application downloaded from the application store, and the first key is used to release the authorization locking on the first application; and the second application has a second authorization lock, the second authorization lock is used to perform the authorization locking on the second application, and the second key is used to release the authorization locking on the second application.

For example, the application store may include at least the first application and the second application. The second application is able to call the first application to implement function(s) of the first application. For example, if the function that may be implemented by the first application is a first function, the second application may implement the first function by calling the first application, even if the second application does not include a code for implementing the first function. An association relationship may be established between the first application and the second application, and a user may use a user equipment (such as a mobile phone, a computer, etc.) to send a request for downloading the second application to the application store. In response to the request, the application store may distribute the second application to the user equipment, and at the same time, since an association relationship is established between the second application and the first application, the application store may distribute the first application together to the user equipment based on the association relationship. When the user equipment runs the downloaded second application, the second application may call the downloaded first application to implement function(s) of the first application.

In the present disclosure, the first application can be considered as a sub-application of the second application, but the code of the first application is independent of the second application. In the application store, the second application and the first application are stored separately and independently. This relationship of being stored separately and independently may effectively save storage resources of the application store occupied by the applications.

After the user equipment downloads the second application from the application store, when the user equipment needs to run (which is not the trial run) the second application, it may send the authorization request to the application store to acquire the authorization permission of the second application. That is, in S101, the application store may receive the authorization request from the user equipment, and the authorization request is used to request the authorization permission of the second application downloaded from the application store.

In some embodiments, the authorization request may contain an identifier of the second application, and the identifier of the second application is used to indicate that the authorization request is used to request the authorization permission of the second application downloaded from the application store.

As described above, when the second application is downloaded, the application store can distribute the second application and the first application together. The first application has the first authorization lock, and the second application has the second authorization lock. For example, information related to the first application distributed by the application store may include a program of the first application and the first authorization lock, and information related to the second application distributed by the application store may include a program of the second application and the second authorization lock. In S102, in response to the authorization request, the application store may send a first key and a second key to the user equipment, that is, distribute the authorization key of the first application and the authorization key of the second application together.

After the user equipment receives the first key and the second key, when running the second application, the second application may detect the second authorization lock and the second key, and create running instances normally. The second application may call the first application to implement the function(s) of the first application, and the first application may detect the first authorization lock and the first key, and create running instances normally.

It can be seen that the application authorization management method provided by the embodiments of the present disclosure may implement the authorization of the second application and the authorization of the first application respectively. When a user requests to acquire the authorization permission of the second application, the application store may package the authorization key (such as the second key) of the second application and the authorization key (such as the first key) of the first application together and distribute them to the user equipment, so as to achieve the authorization of the first application and the second application together.

In some embodiments, for the first application and the second application, the authorization lock of each application is independent of the program of the application and is not an authorization encryption strategy implanted inside the program of the application. After the application has been put on the shelf in the application store, the authorization lock of the application may still be adjusted (such as canceled or changed, etc.). When the authorization lock is adjusted, the service logic of the application will not be affected, so that the functional stability of the application may be guaranteed.

In some implementations, the first application includes a first identifier, and the first identifier is used to identify that the authorization locking is performed on the first application; and the second application includes a second identifier, and the second identifier is used to identify that the authorization locking is performed on the second application.

Exemplarily, there may be a field for marking whether the authorization locking is performed on the first application, on a predefinition of the first application, and the field is the first identifier. There also may be a field for marking whether the authorization locking is performed on the second application, in a predefinition of the second application, and the field is the second identifier. When the user equipment runs the second application, the user equipment may determine, based on the second identifier, whether it needs to send the authorization request to the application store, to acquire the authorization permission of the second application. For example, when the user equipment has detected the second identifier, the user equipment may show prompt information to the user, to prompt the user to perform an operation for acquiring the authorization permission of the second application, and in response to the operation, the user equipment may send the authorization request to the application store. After receiving the authorization request, the application store may determine, based on the second identifier and the first identifier respectively, the second authorization lock and the second key and the first authorization lock and the first key that need to be returned to the user equipment. If the first application does not have the first identifier, it means that the authorization locking is not performed on the first application, and the application store does not need to send the first authorization lock and the first key to the user equipment.

Figure 2:
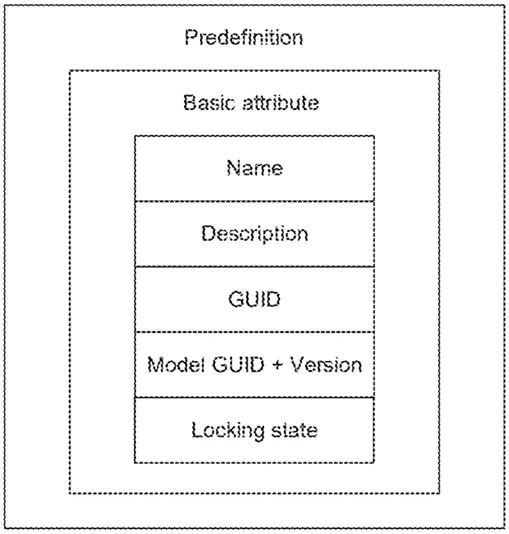
FIG. 2 is a schematic diagram of compositions of a predefinition of an application provided by the embodiments of the present disclosure.

For example, FIG. 2 is a schematic diagram of compositions of a predefinition of an application provided by the embodiments of the present disclosure. The application may be the first application or the second application. Taking the case where what is shown in FIG. 2 is the predefinition of the first application as an example, as shown in FIG. 2, the predefinition of the first application may include: fields such as name, description, GUID, model GUID+version, locking state, etc., where the field "locking state" is the first identifier, indicating that the authorization locking is performed on the first application.

Herein, the meanings of the fields such as name, description, GUID, model GUID+version, etc., will be described in detail in the following embodiments.

The predefinition of the second application is similar to the predefinition of the first application and will not be repeated.

In some implementations, an authorization lock (such as the first authorization lock and the second authorization lock) for authorization locking includes: an authorization field, used to identify that the authorization lock has a function of controlling authorization time of an application; and a key corresponding to the authorization lock includes: valid usage time of the key.

Taking the first authorization lock as an example, the first authorization lock may include a first authorization field, and the first authorization field is used to identify that the first authorization lock has a function of controlling the authorization time of the application. The first key corresponding to the first authorization lock includes: valid usage time of the first key. Assuming that the valid usage time of the first key is one month, it means that the first authorization lock and the first key may perform valid authorization on the first application for one month, and after one month, the first key becomes invalid and the first application can no longer create a running instance.

In some implementations, an authorization lock used for the authorization locking includes one or more of: an identifier of an application on which the authorization locking is performed by using the authorization lock, an identifier of the authorization lock, and an authorization type; and the authorization type includes free and paid. A key corresponding to an authorization lock includes one or more of: an identifier of the key, an identifier of the authorization lock corresponding to the key, and an identifier of an application on which the authorization locking is performed by using the authorization lock corresponding to the key.

Taking the first authorization lock as an example, the first authorization lock may include an identifier of the first application on which the authorization locking is performed by using the first authorization lock (such as an identifier of the predefinition of the first application), an identifier of the first authorization lock (such as an authorization lock ID), an authorization type (such as free or paid), or the like. The first key corresponding to the first authorization lock may include: an identifier of the first key, an identifier of the first authorization lock corresponding to the first key, an identifier of the first application on which the authorization locking is performed by using the first authorization lock corresponding to the first key, or the like.

In some embodiments, an authorization lock may generate multiple authorization keys, which is not limited here.

In some embodiments, in the embodiments of the present disclosure, a copyright owner of the first application and a copyright owner of the second application may be the same or different, and a developer of the first application and a developer of the second application may also be the same or different.

For example, the developer of the first application is a development organization 1, and the developer of the second application is a development organization 2, but the copyright owner of the first application and the copyright owner of the second application are both a corporation A. Alternatively, the developer of the first application is a development organization 1 and the copyright owner of the first application is a corporation A, and the developer of the second application is a development organization 2 and the copyright owner of the second application is a corporation B. Alternatively, the copyright owner of the first application is a corporation A, and the copyright owner of the second application is a corporation B, but the developer of the first application and the developer of the second application are both a development organization 1.

In some embodiments, in the embodiments of the present disclosure, the first application and the second application may be put on the shelf in the application store by their respective copyright owners, or may also be put on the shelf in the application store by their respective developers, which is not limited here.

In some implementations, the authorization locking is performed on the first application by a copyright owner of the first application using the first authorization lock; and the authorization locking is performed on the second application by a copyright owner of the second application using the second authorization lock. For example, the authorization locking is performed on the first application by the corporation A using the first authorization lock; and the authorization locking is performed on the second application by the corporation B using the second authorization lock.

In some embodiments, the application store may include information of a developer corresponding to each application and information of a copyright owner corresponding to each application, such as a team name of the developer, a corporation name and an address of the copyright owner.

In some implementations, the second application further has an association relationship with a third application downloaded from the application store, and is able to call the third application to implement function(s) of the third application; when the authorization locking is not performed on the third application, and in response to the authorization request, the first key and the second key are sent; and when the authorization locking is performed on the third application, and in response to the authorization request, the first key, the second key and a third key are sent, where the third key is used to release the authorization locking on the third application. For example, the authorization lock of the third application may be a third authorization lock.

The above embodiments introduce the application authorization management method provided by the embodiments of the present disclosure, from the perspective of the application store. Corresponding to the aforementioned embodiments, the embodiments of the present disclosure further provide an application authorization management method, which may be applied to a user equipment.

Figure 3:
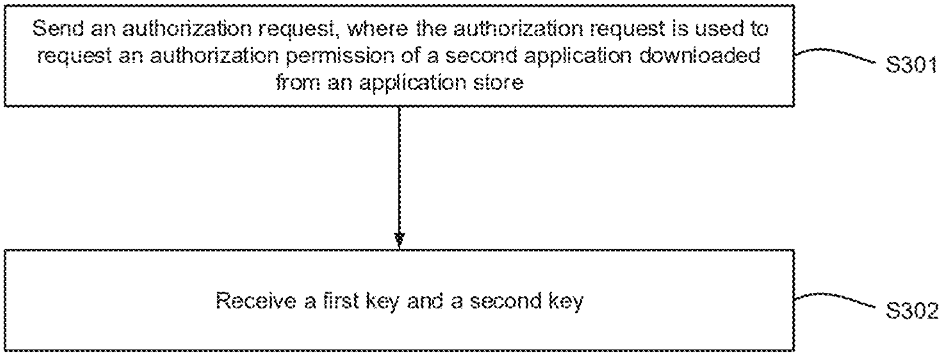
FIG. 3 is another schematic flow diagram of an application authorization management method provided by the embodiments of the present disclosure.

Exemplarily, FIG. 3 is another flow schematic diagram of an application authorization management method provided by the embodiments of the present disclosure. As shown in FIG. 3, the application authorization management method may include the following contents.

S301: sending an authorization request, where the authorization request is used to request an authorization permission of a second application downloaded from an application store.

The second application has an association relationship with a first application, and the second application is able to call the first application to implement a function of the first application.

S302: receiving a first key and a second key.

Herein, the first application has a first authorization lock, the first authorization lock is used to perform authorization locking on the first application downloaded from the application store, and the first key is used to release the authorization locking on the first application. The second application has a second authorization lock, the second authorization lock is used to perform the authorization locking on the second application, and the second key is used to release the authorization locking on the second application.

The application authorization management method applied to the user equipment completely corresponds to the application authorization management method applied to the application store provided by the aforementioned embodiments, and the specific content of the application authorization management method applied to the user equipment may be referred to what is described in the aforementioned embodiments and will not be repeated.

In conjunction with the embodiments shown in FIG. 1 and FIG. 3, it can be seen that in the present disclosure, the process of the application authorization management actually involves a logic of an interaction between the user equipment and the application store. Based on this, the embodiments of the present disclosure may further provide the implementation of the application authorization management from the perspective of the interaction between the user equipment and the application store.

Figure 4:
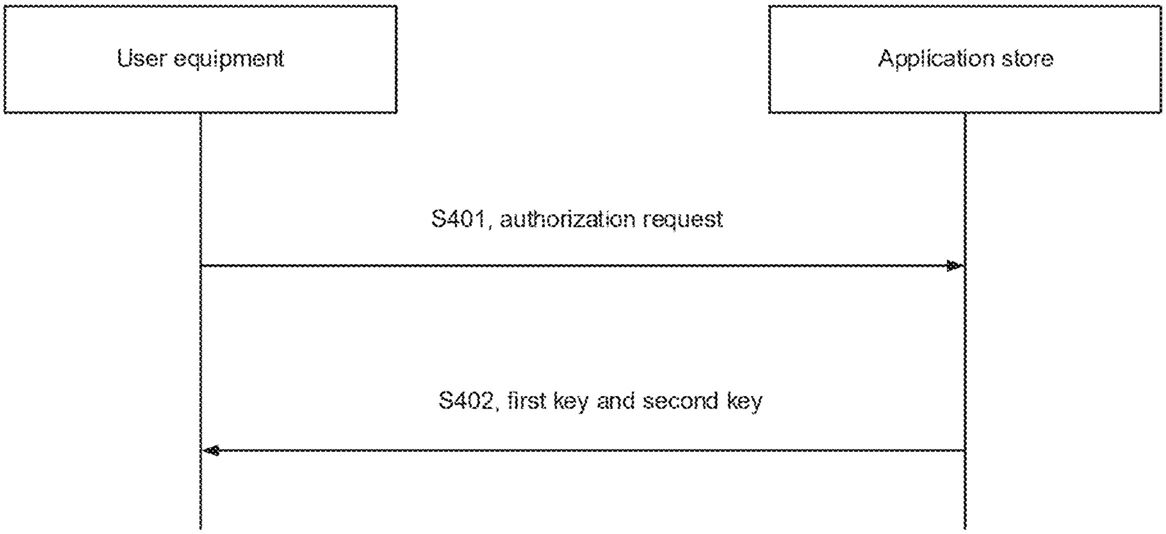
FIG. 4 is yet another flow schematic diagram of an application authorization management method provided by the embodiments of the present disclosure.

For example, FIG. 4 is yet another flow schematic diagram of an application authorization management method provided by the embodiments of the present disclosure. As shown in FIG. 4, the application authorization management method may include the following contents.

S401: the user equipment sends an authorization request to the application store.

The authorization request is used to request an authorization permission of a second application downloaded from the application store.

Correspondingly, the application store receives the authorization request.

S402: The application store sends a first key and a second key to the user equipment.

Correspondingly, the user equipment receives the first key and the second key.

Similarly, the specific implementation of the embodiment shown in FIG. 4 may refer to what is described in the embodiments shown in FIG. 1, and will not be repeated.

The following is an exemplary description of the implementation of the association relationship between the first application and the second application in the above embodiments.

In some implementations, the second application may include first information, and the first information is used to indicate the first application associated with the second application. The application store establishing the association relationship between the first application and the second application, may include: establishing the association relationship between the first application and the second application based on the first information included in the second application; or using the first information included in the second application as the association relationship between the first application and the second application.

In some embodiments, when developing the second application, the developer of the second application may add an identifier of the first application or add some fields capable of indicating the first application into the second application. The identifier of the first application or the field(s) capable of indicating the first application is the aforementioned first information. That is, the first information may include: the identifier of the first application or some fields capable of indicating the first application.

In the present disclosure, different applications in the application store have different identifiers. That is, different applications in the application store have unique identifiers.

In one implementation, the first application and the second application have a same developer, so that the developer may complete the development of the first application locally, and develop and generate the second application based on the first application, and then put the first application and the second application on the shelf in the application store.

In another implementation, the first application and the second application have different developers, and the application store may include the first application, so that the developer may acquire the first application from the application store, and develop and generate the second application according to the first application, and then put the second application on the shelf in the application store.

The following is an exemplary description in a way in which the developer acquires the first application from the application store, and develops and generates the second application according to the first application.

For example, a device at the development side may send a request for downloading the first application to the application store. The device at the development side may include a server, a computer, or the like, used by the developer. In response to the request for downloading the first application, the application store may send the first application to the device at the development side. The request for downloading the first application may include an identifier of the first application, and the application store may find the stored first application based on the identifier of the first application, and distribute it to the device at the development side. At this time, the device at the development side may acquire the first application from the application store. The developer may generate the second application according to the first application. For example, the developer may develop the second application, and add an interface capable of calling the first application into the second application, so that the second application is able to call the first application to implement the function of the first application. After the development of the second application is completed, the device at the development side may put the second application on the shelf in the application store.

Exemplarily, the process of generating the second application according to the first application may be as follows.

1) Create an APP model of the second application, and assign a unique identifier (such as a globally unique identifier) for the APP model of the second application. For example, the developer of the second application may create the APP model of the second application in a development studio.

2) Define a data model that the APP model of the second application depends on, publish a data predefinition of the data model that the APP model of the second application depends on (referred to as the data predefinition of the second application, for short) to a system warehouse of the second application, and assign a unique identifier (such as a globally unique identifier) for the data predefinition of the second application; where the system warehouse of the second application is namely a system warehouse used by the developer who develops the second application, and the system warehouse of the second application and the development studio of the developer of the second application may be connected via the network.

The model is information that describes a structure of an object when modeling an abstraction, and the predefinition is information of parameter(s) configured for the model whose structure has been determined. The predefinition records the information of the model and the predefinition is used to instantiate the object, which means building a structure of the object according to the structure of its model and taking the parameter value as an initial value of the object. The predefinition can also be referenced by other models as a sub-predefinition.

For example, when creating the data model, operations may include: creating a model newly, assigning a name and an identifier; adding member(s), specifying a member type; deleting member(s); adding or deleting sub-predefinition(s); setting an initial value of the sub-predefinition; updating a model version; publishing a certain model version and generating a predefinition, etc. When creating a predefinition, operations may include: specifying a certain model version and publishing (creating) the predefinition; assigning a name and an identifier; setting parameter values (attributes and members) of the predefinition, etc.

Figure 5:
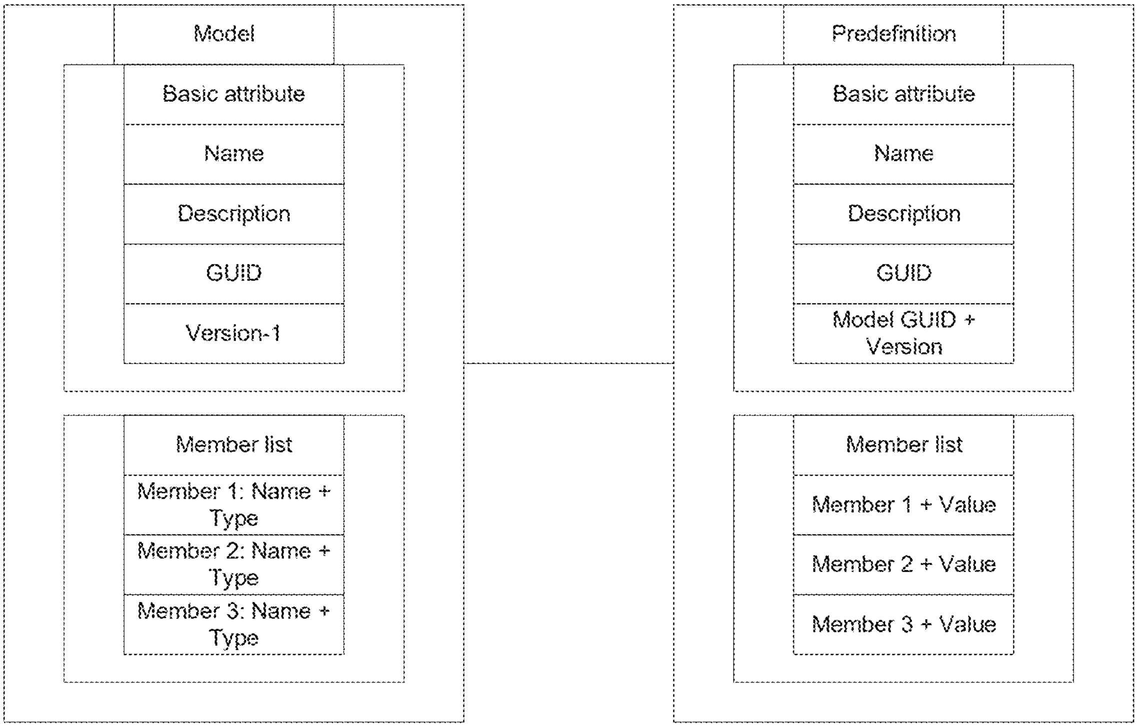
FIG. 5 is a schematic diagram of a relationship between a model and a predefinition provided by the embodiments of the present disclosure.

FIG. 5 is a schematic diagram of a relationship between a model and a predefinition provided by the embodiments of the present disclosure. As shown in FIG. 5, the model may include a basic attribute and a member list; the basic attribute may include information such as name, description, globally unique identifier (GUID), version, etc.; and the member list may include: information such as "member 1: name+type", "member 2: name+type", "member 3: name+type", etc. The predefinition may include a basic attribute and a member list; the basic attribute may include information such as name, description, GUID, model GUID+version, etc.; and the member list may include: information such as "member 1+value", "member 2+value", "member 3+value", etc.

The data model described in the step 2) is a concept in the spatial-temporal database, which describes the structure of the data object in the spatial-temporal database and is an abstract description of the object in the objective world.

Figure 6:
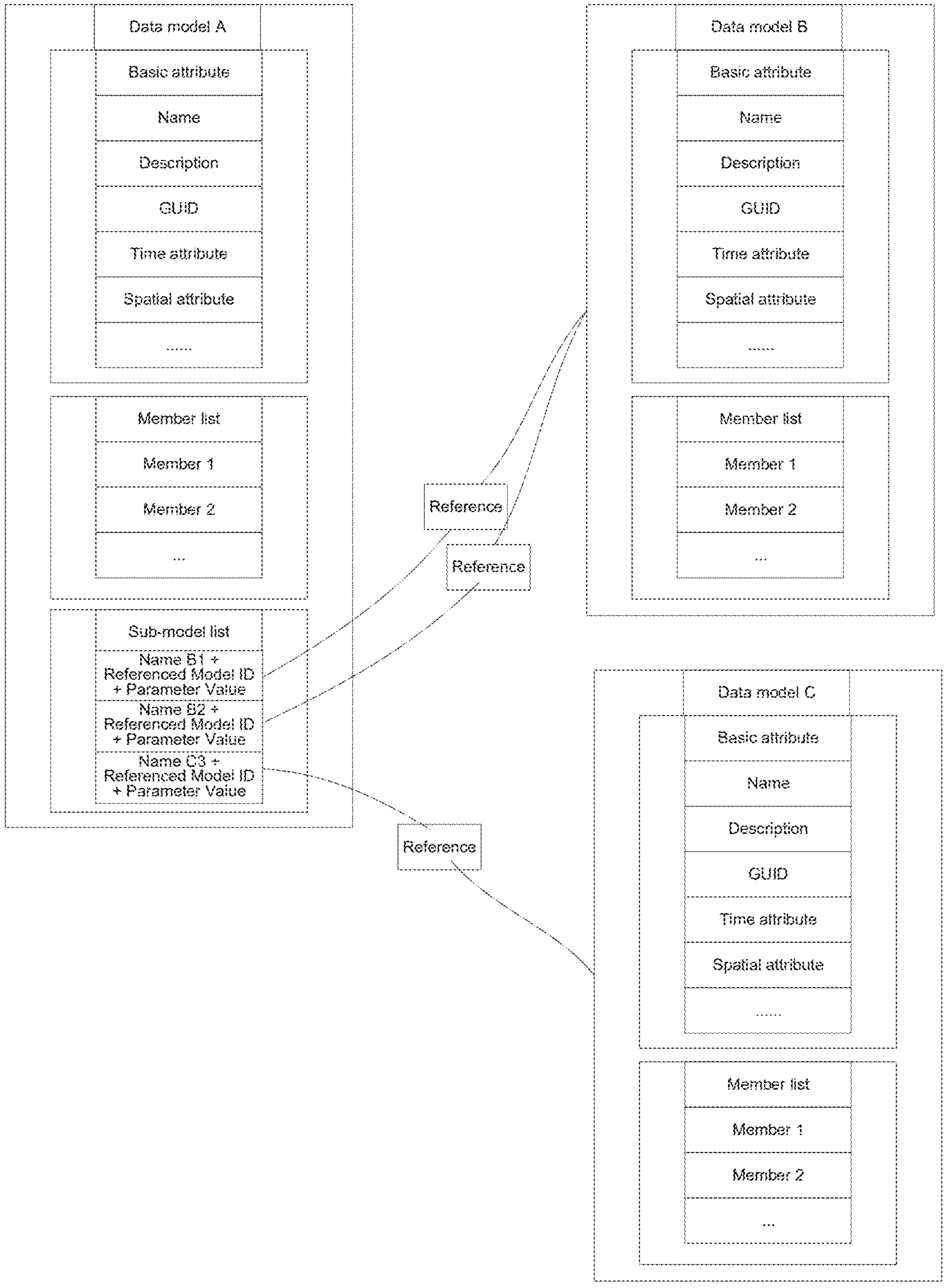
FIG. 6 is a schematic diagram of a data model provided by the embodiments of the present disclosure.

Exemplarily, FIG. 6 is a schematic diagram of a data model provided by the embodiments of the present disclosure. As shown in FIG. 6, the data model may include: a basic attribute, a member list, and a sub-model list. A data model with sub-models is a composite data model, for example, a data model A in the figure is a composite data model, and a data model B and a data model C are sub-models of the data model A.

In the data model, the basic attribute describes inherent attributes of data, including name, description, GUID, time attribute (such as precision), spatial attribute (such as coordinate system, geometric shape), etc.; and the member list describes freely defined fields, where each member describes its field name and data type, such as member 1, member 2, etc. The sub-model list records identifiers of data predefinitions of data models referenced as the sub-models, and establishes a dependency relationship between the sub-model and the data model, for example, the sub-model list of the data model A includes identifiers of data predefinitions of the data model B and the data model C, such as "name B1+referenced model ID+parameter value", "name B2+referenced model ID+parameter value", "name C3+referenced model ID+parameter value", etc.

3) Define a resource object that the APP model of the second application depends on (referred to as a resource object of the second application, for short) into a resource repository, and assign a unique identifier (such as a globally unique identifier) to the resource object of the second application.

Herein, the resource object is a concept in the spatial-temporal database. Objectified organization and management are performed on binary file data, and an identifier is assigned to each resource object, so that the APP model of the second application can access the data of the resource object by the identifier of the resource object. For example, an icon is defined as a resource object to form a dependency relationship with the APP model of the second application, and then the APP model of the second application may use this icon. For another example, a video file is defined as a resource object to form a dependency relationship with the APP model of the second application, and then the APP model of the second application may read, by the dependency relationship, the video file for playback.

4) Establish a dependent data predefinition list of the second application on the APP model of the second application, select a data predefinition of the second application from the system warehouse of the second application, and record the identifier of the data predefinition of the second application onto the dependent data predefinition list of the second application. The data predefinition in the system warehouse of the second application may be established by the developer himself, or purchased from the application store.

5) Establish a dependent resource list of the second application on the APP model of the second application, select a resource object of the second application from the resource repository, and record the identifier of the resource object of the second application onto the dependent resource list of the second application. Herein, the resource object in the resource repository may be established by the developer himself, or purchased from the application store.

6) Add a sub-APP list of the APP model of the second application, select a predefinition of the first application that is a sub-APP from the system warehouse of the second application, and record an identifier of the predefinition of the first application onto the sub-APP list of the APP model of the second application. The predefinition of the first application is the first application obtained from the application store in S201 to S202. The identifier of the predefinition of the first application is the identifier of the first application described in the aforementioned embodiments. The predefinition of the first application may be uploaded to the application store by the copyright owner or the developer of the first application.

7) Write a program logic of functional functions of the APP model of the second application.

8) Publish the predefinition of the APP model of the second application (referred to as the predefinition of the second application, for short) to the system warehouse of the second application, and assign a unique identifier (such as a globally unique identifier) to the predefinition of the second application. The identifier of the predefinition of the second application is the identifier of the second application. Herein, when publishing the predefinition of the second application, parameter values (such as attributes and members) of the predefinition may also be set.

Figure 7:
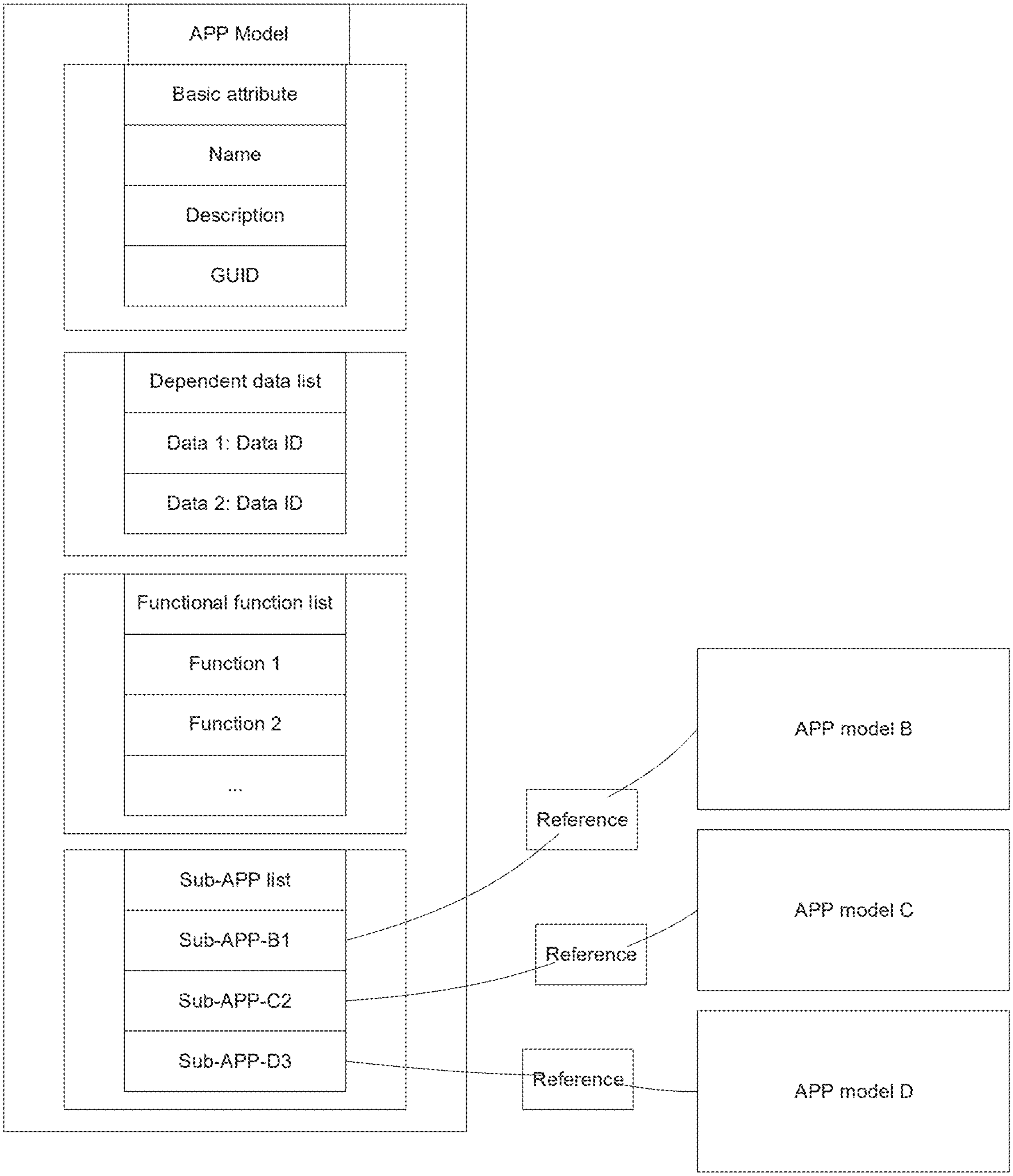
FIG. 7 is a schematic diagram of compositions of an APP model of a second application provided by the embodiments of the present disclosure.

Exemplarily, FIG. 7 is a schematic diagram of compositions of an APP model of a second application provided by the embodiments of the present disclosure. As shown in FIG. 7, the APP model of the second application may include: a basic attribute, a dependent data list, a functional function list, and a sub-APP list. The basic attribute may include: name, description, and GUID (namely a unique identifier of the APP model of the second application). The dependent data list records a data model or a resource object that the APP model of the second application needs to use, and establishes a relationship between the APP model of the second application and the dependent data model or the resource object. For example, "data 1: data ID", "data 2: data ID", etc., represent the identifier of the data predefinition of the dependent data model or the identifier of the resource object. The dependent data list may include the aforementioned dependent data predefinition list and/or the aforementioned dependent resource list. The functional function list may include: functional functions of the APP model of the second application, such as function 1, function 2, etc., and these functional functions are the implementation of the program logic of the APP model of the second application. The sub-APP list records the information of the first application and an association relationship established between the APP model of the second application and the first application. For example, the sub-APP list may include identifiers and configuration parameters of first applications such as sub-APP-B1, sub-APP-C2, and sub-APP-D3, etc. That is, APP model B, APP model C, APP model D, etc., may be the aforementioned first application.

Through the process described in the above step 1) to step 8), generating the second application according to the first application may be achieved.

It can be understood that the development process of the first application is similar to the development process of the second application. The only difference is that when the first application does not include a deeper level of sub-APPs (i.e., the first application does not call other applications to implement function(s) of other applications), the development process of the first application does not include a process similar to that described in the above step 6). When the first application also includes a deeper level of sub-APPs (i.e., the first application calls other applications to implement function(s) of other applications), the development process of the first application is consistent with the process described in the above step 1) to step 8). The development process of the first application will not be repeated here.

It should be noted that the second application and the first application may depend on the same data predefinition or resource object, because the dependency relationship is established when the second application and the first application are developed separately. That is, the dependent data lists of the second application and the first application may record the identifier of the same data predefinition or resource object.

Exemplarily, by taking the case where the second application is put on the shelf in the application store by the copyright owner of the second application as an example, the process of the copyright owner of the second application putting the second application on the shelf in the application store is as follows.

1) The copyright owner of the second application creates an APP product of the second application in the application store, and the APP product of the second application includes an identifier of the predefinition of the second application.

Herein, the APP product refers to the corresponding information established for the predefinition of the APP in the application store, which mainly describes commercialization information of the predefinition of the APP. For example, the APP product of the second application may also include a logo, video, product price, product name, product description or the like of the second application.

2) The application store determines the system warehouse of the second application to which the predefinition of the second application corresponding to the APP product of the second application belongs, according to a registered account of the copyright owner of the second application in the application store (or a system product code of the copyright owner of the second application). That is, the application store can determine from which system warehouse the predefinition of the second application corresponding to the APP product of the second application comes, according to the registered account of the copyright owner of the second application in the application store.

3) The application store requests the system warehouse of the second application to put the predefinition of the second application on the shelf, according to the identifier of the predefinition of the second application included in the APP product of the second application.

4) In response to the request for putting the predefinition of the second application on the shelf from the application store, the system warehouse of the second application performs the following step (4.1) to step (4.2). (4.1) The system warehouse of the second application uploads the predefinition of the second application to the application store, where the predefinition of the second application may include the APP model and configuration parameters of the second application. (4.2) The system warehouse of the second application, according to the dependent data predefinition list and the dependent resource list of the second application, uploads the data predefinition and the resource object of the second application to the application store.

Through the process described in the above step 1) to step 4), putting the second application on the shelf in the application store may be achieved.

It should be noted that in the above step 4), when the second application is also associated with other local sub-APPs (not sub-APPs acquired from the application store), the system warehouse of the second application may also upload the predefinition of the local sub-APP associated with the second application to the application store, and upload the data predefinition and the resource object of the local sub-APP to the application store according to the dependent data predefinition list and the dependent resource list of the local sub-APP. For the first application, since data related to the first application already exists in the application store, the system warehouse of the second application does not need to upload the data related to the first application to the application store, the data is, for example, the predefinition of the first application, the data predefinition and the resource object of the first application, or the like. Therefore, the application store only includes one copy of the data related to the first application, thereby achieving the effect of saving storage resources of the application store as described in the above embodiments.

In some embodiments, in the present disclosure, the second application may be referred to as a finished product APP, and the sub-APP of the second application (such as the first application) may be referred to as a part APP. The finished product APP may be a program that can run independently. The part APP may be an APP program that can run independently, or a program that does not run independently. The part APP can serve as a sub-APP of one or more finished product APPs, and be implemented as being called by the finished product APPs to implement function (s) of the part APP.

It can be understood that the part APP and the finished product APP are relative concepts, and any application that serves as a sub-APP may be called as a part APP. For example, when there is a fourth application that can call the second application to implement function(s) of the second application, the fourth application is a finished product APP and the second application is a part APP.

With a specific example, the application authorization management method provided by the embodiments of the present disclosure is further illustrated below.

Figure 8:
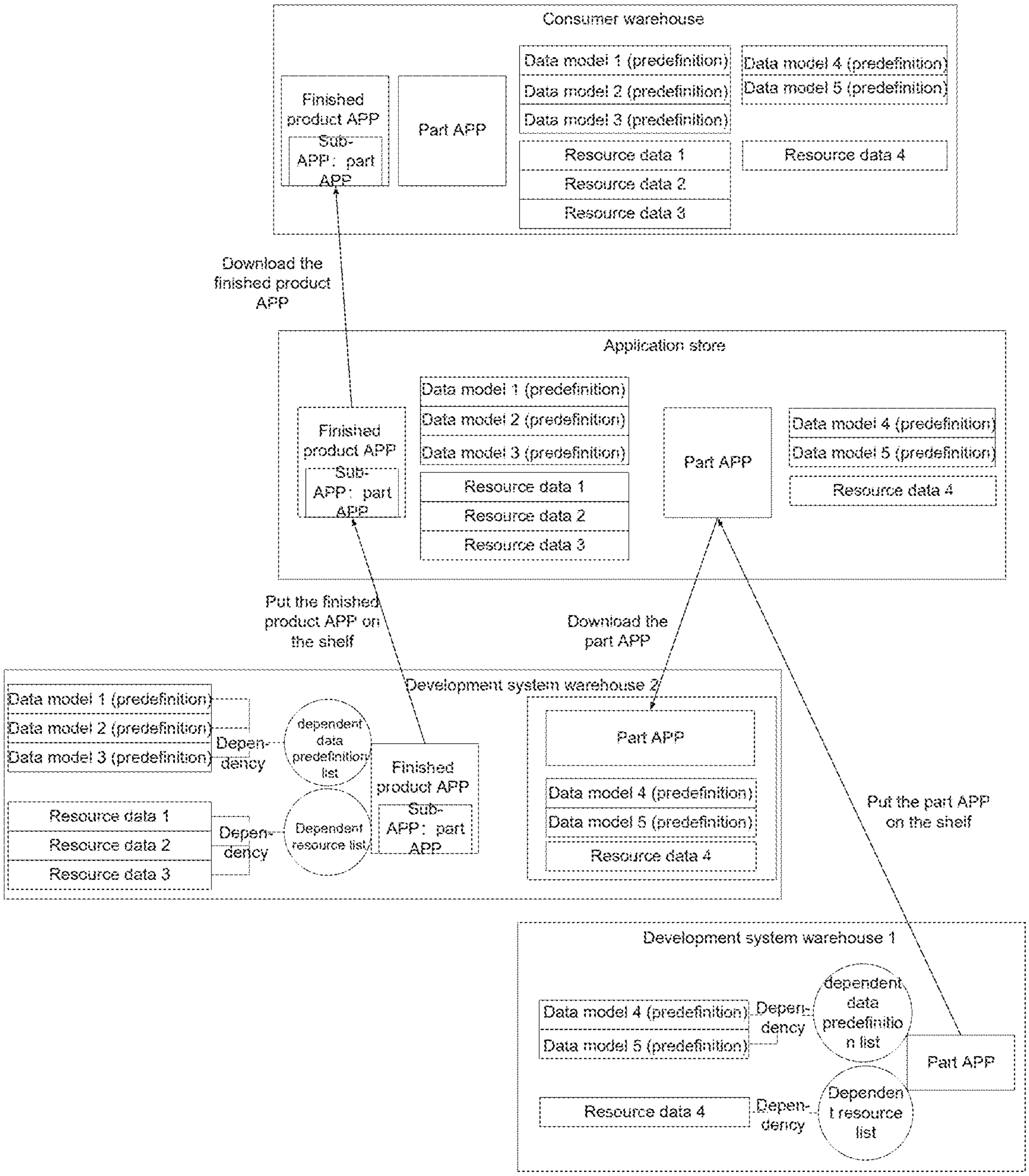
FIG. 8 is a schematic diagram of compositions of an application management system provided by the embodiments of the present disclosure.

FIG. 8 is a schematic diagram of compositions of an application management system provided by the embodiments of the present disclosure. As shown in FIG. 8, an application management system may consist of a development system warehouse 1, a development system warehouse 2, an application store, and a consumer warehouse.

The development system warehouse 1 may be a system warehouse for developing a part APP (such as the above first application). The developer of the part APP may complete the development of the part APP in the development system warehouse 1 and put the part APP on the shelf in the application store. Herein, the part APP may include a dependent data predefinition list and a dependent resource list. The dependent data predefinition list establishes the dependency relationship between the part APP and data model 4 (predefinition) and data model 5 (predefinition). The dependent resource list establishes the dependency relationship between the part APP and the resource data 4.

The development system warehouse 2 may be a system warehouse for developing a finished product APP (such as the above second application). The developer of the finished product APP may download a part APP from the application store into the development system warehouse 2, complete the development of the finished product APP in the development system warehouse 2 according to the part APP, and put the finished product APP on the shelf in the application store. Herein, the finished product APP may include a dependent data predefinition list and a dependent resource list. The dependent data predefinition list establishes the dependency relationship between the finished product APP and data model 1 (predefinition), data model 2 (predefinition), and data model 3 (predefinition). The dependent resource list establishes the dependency relationship between the finished product APP and resource data 1, resource data 2, and resource data 3. The finished product APP established an association relationship with the part APP, and is able to call the part APP to implement function (s) of the part APP.

The consumer warehouse may be a warehouse on the consumer (user) side that consumes and uses the second application. The consumer may use a user equipment to download the finished product APP from the application store into the consumer warehouse. When the consumer uses the user equipment to download the finished product APP from the application store, the application store may distribute the finished product APP and the part APP together to the consumer warehouse.

Exemplarily, the process of the consumer downloading the finished product APP from the application store may include that: 1) the consumer performs an instruction for downloading the finished product APP by the user equipment in an interactive interface provided by the application store, to trigger the user equipment to send a request for downloading the finished product APP to the application store, where the request for downloading the finished product APP may specify the name of the finished product APP (such as including the identifier of the finished product APP). 2) The application store distributes the predefinition of the finished product APP to the consumer warehouse, according to the name of the finished product APP specified in the request for downloading the finished product APP. 3) The application store, according to the dependent data predefinition list and the dependent resource list of the predefinition of the finished product APP, finds the data predefinition and resource data that the finished product APP depends on, and distributes them to the consumer warehouse. 4) The application store, according to the identifier of the part APP included in the finished product APP (such as by querying the sub-APP list of the finished product APP), distributes the predefinition of the part APP to the consumer warehouse. 5) The application store, according to the dependent data predefinition list and the dependent resource list of the predefinition of the part APP, finds the data predefinition and resource data that the part APP depends on, and distributes them to the consumer warehouse.

In some embodiments, the aforementioned development system warehouses (the development system warehouse 1 and the development system warehouse 2) may be a part of an APP development system, and the APP development system may also include a developer studio. The developer studio refers to a system in which the developer edits the APP model, which can perform APP model management operations such as creating, editing, publishing, etc. The development system warehouse is a system that stores the APP model that is developed and completed by the developer and publishes the finished product APP predefinition.

In some embodiments, the consumer warehouse may be a part of a consumer application system, and the consumer application system may also include an APP running environment, and an APP operation and maintenance system. The consumer application system refers to a service application system of an independent manufacturing enterprise, the manufacturing enterprise completes service activities on the system and is responsible for maintaining the service application system. The consumer warehouse is a system for storing the APP predefinition purchased by the consumer. The APP operation and maintenance system is a system for the consumer to operate and maintain the APP. The APP running environment is an environment system that runs the APP.

After the finished product APP and the part APP are downloaded to the consumer warehouse, the finished product APP predefinition may create an APP running instance, specify the running environment (computer node), and allocate computer resources (such as central processing unit (CPU), memory, network bandwidth, etc.). The APP running instance has an identifier of the predefinition of the APP. The APP operation and maintenance system may, according to the identifier of the predefinition of the APP on the APP running instance, deploy the functional logic of the APP model (the predefinition of the APP carries the identifier of the APP model) of the predefinition of the APP to the designated computer node. The APP operation and maintenance system, the consumer warehouse, and the APP running environment complete the deployment process of APP program files via the network communication. After the deployment is completed, the running of the APP instance may be started and the functional function logic of the APP instance is started to be executed.

In some embodiments, the application store may include a store system consisting of a storefront system and a trading system. The store system may serve as a commodity trading circulation system operated by an operator of the application store. The APP software development enterprise (i.e., the developer) and the APP software manufacturing enterprise (i.e., the consumer) may complete the trading and sharing of the APP by the store system. Herein, the storefront system may include one or more stores, used to store APP products put on the shelf, and to be responsible for shelving, downloading, authorization key distribution of the APP, or the like. The trading system may implement functions such as order management, payment management, etc.

In the present disclosure, collaborative development may be implemented between the developer of the finished product APP and the developer of the part APP, which can effectively improve the development efficiency of the finished product APP. The part APP can be called by one or more finished product APPs to implement function(s) of the part APP, enabling that the part APP can be reused among different development organizations. By the application store, the part APP can be used by more development organizations, so that the value of the part APP is enlarged, and the value of the part APP's developer is also enlarged, which can improve the enthusiasm of APP developers.

Taking the scenario of an industrial APP as an example, by this collaborative mode, many industrial APP developers can divide up the work, so that the complex industrial APP is transformed from being developed by a single developer to being developed collaboratively by many developers, and the output efficiency of the industrial APP will be improved.

In addition, the finished product APP and the part APP are stored separately in the application store, which may guarantee that there is no redundant data and save the storage resources of the application store occupied by the APPs.

Figure 9:
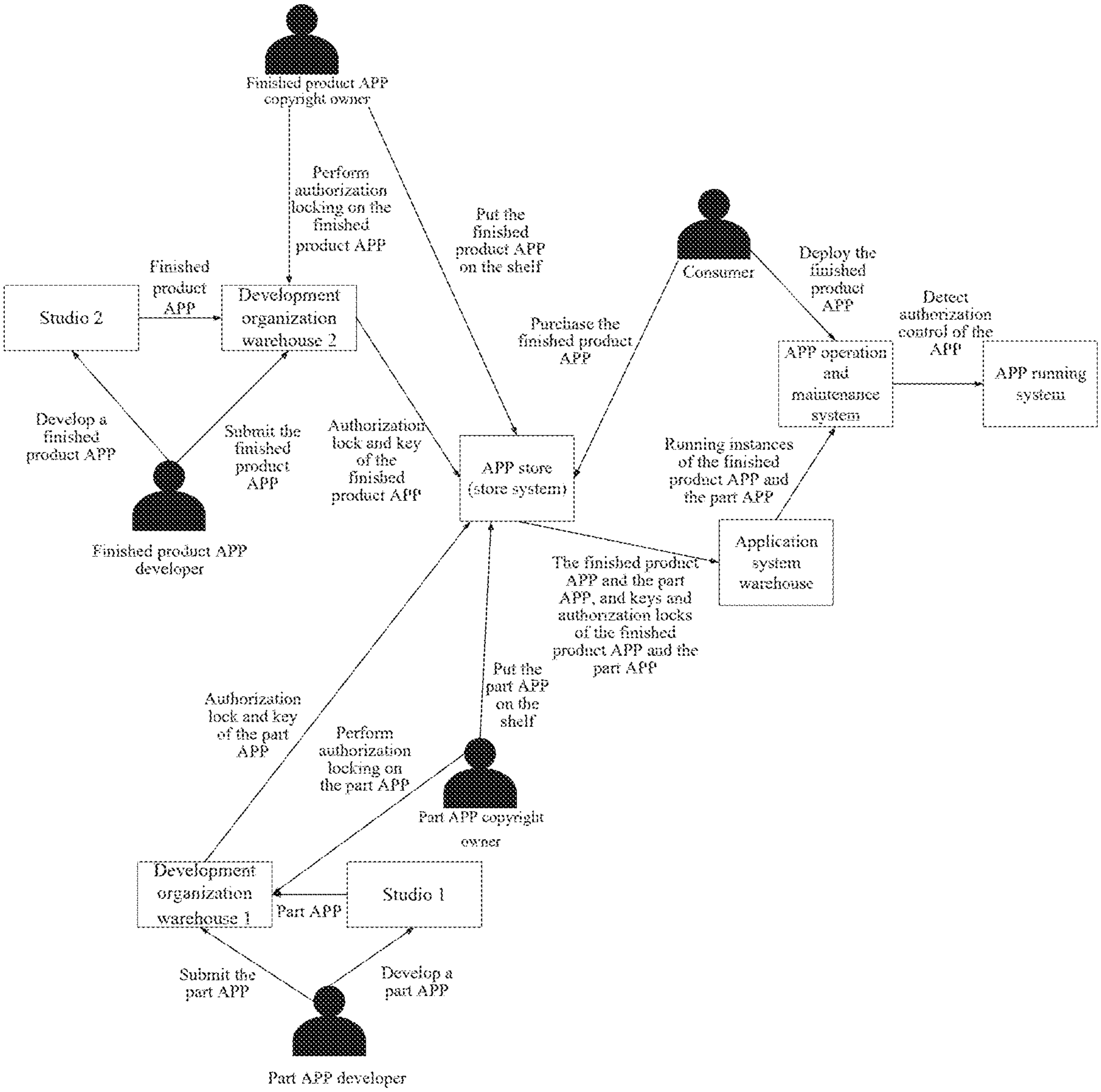
FIG. 9 is a schematic diagram of another composition of an application management system provided by the embodiments of the present disclosure.

FIG. 9 is a schematic diagram of another composition of an application management system provided by the embodiments of the present disclosure. As shown in FIG. 9, for the application management system shown in FIG. 8, the development system warehouse 1 may include a development organization warehouse 1 and a studio 1, the development system warehouse 2 may include a development organization warehouse 2 and a studio 2, and the consumer warehouse may include an application system warehouse, an APP operation and maintenance system, and an APP running system (i.e., the APP running environment).

The part APP developer may develop the part APP in the studio 1 and submit the part APP to the development organization warehouse 1. The copyright owner of the part APP may decide whether to perform authorization locking on the part APP in the development organization warehouse 1, and put the part APP in the development organization warehouse 1 on the shelf in the application store. Herein, the process of the authorization locking is not related to the development process of the part APP, and the part APP developer cannot perform the authorization locking on the part APP.

The copyright owner of the part APP performing the authorization locking on the part APP, may refer to setting a locking state on the predefinition of the part APP, that is, modifying an authorization protection state of the predefinition of the part APP to the locking state, and meanwhile, creating an authorization lock of the predefinition of the part APP in the development organization warehouse 1. When the copyright owner of the part APP puts the part APP on the shelf, the predefinition of the part APP may be uploaded from the development organization warehouse 1 to the store of the application store (for details, please refer to the aforementioned embodiments).

The copyright owner of the finished product APP may download the part APP to the development organization warehouse 2. If the part APP is in the authorization locking state (the value is true), which means that the predefinition of the part APP has an authorization lock, the application store will download the part APP and the authorization lock together to the development organization warehouse 2.

The finished product APP developer may assemble the part APP in the studio 2 and complete the development of the finished product APP (for details, please refer to the aforementioned embodiments), and after the development is completed, submit the finished product APP to the development organization warehouse 2. The copyright owner of the finished product APP may decide whether to perform authorization locking on the finished product APP in the development organization warehouse 2, and put the finished product APP in the development organization warehouse 2 on the shelf in the application store. The process of the copyright owner of the finished product APP performing the authorization locking on the finished product APP is the same as or similar to the process of the copyright owner of the part APP performing the authorization locking on the part APP, and will not be repeated here. When the copyright owner of the finished product APP puts the finished product APP on the shelf, the predefinition of the finished product APP may be uploaded from the development organization warehouse 2 to the store of the application store (for details, please refer to the aforementioned embodiments).

The consumer may use the user equipment to download the finished product APP from the application store, and as mentioned above, when the finished product APP is downloaded, the finished product APP and the part APP are distributed together. For example, the application store may distribute the finished product APP and the part APP to the application system warehouse (also called the consumer warehouse). The downloaded finished product APP and part APP may be deployed to the APP operation and maintenance system. The finished product APP and the part APP may each have a corresponding authorization lock. When the consumer needs to acquire an authorization permission of the finished product APP, he may purchase the finished product APP from the application store by the user equipment (such as sending an authorization request). In response to the authorization request, the application store may distribute the authorization keys (referred to as keys, for short) of the finished product APP and the part APP to the application system warehouse, where the authorization key of the finished product APP is used to release the authorization locking on the finished product APP, and the authorization key of the part APP is used to release the authorization locking on the part APP.

In one implementation, the keys and the authorization locks of the finished product APP and the part APP may be stored in their respective development organization warehouses respectively, and the application store may copy the keys and the authorization locks from the respective development organization warehouses and distribute them. For example, the application store may copy the key and the authorization lock of the part APP from the development organization warehouse 1 and copy the key and the authorization lock of the finished product APP from the development organization warehouse 2, and distribute them to the consumer's application system warehouse.

In another implementation, the keys and the authorization locks of the finished product APP and the part APP may be uploaded to the application store in advance. For example, the key and the authorization lock of the part APP may be uploaded to the application store together with the part APP, and the key and the authorization lock of the finished product APP may be uploaded to the application store together with the finished product APP.

Figure 10:
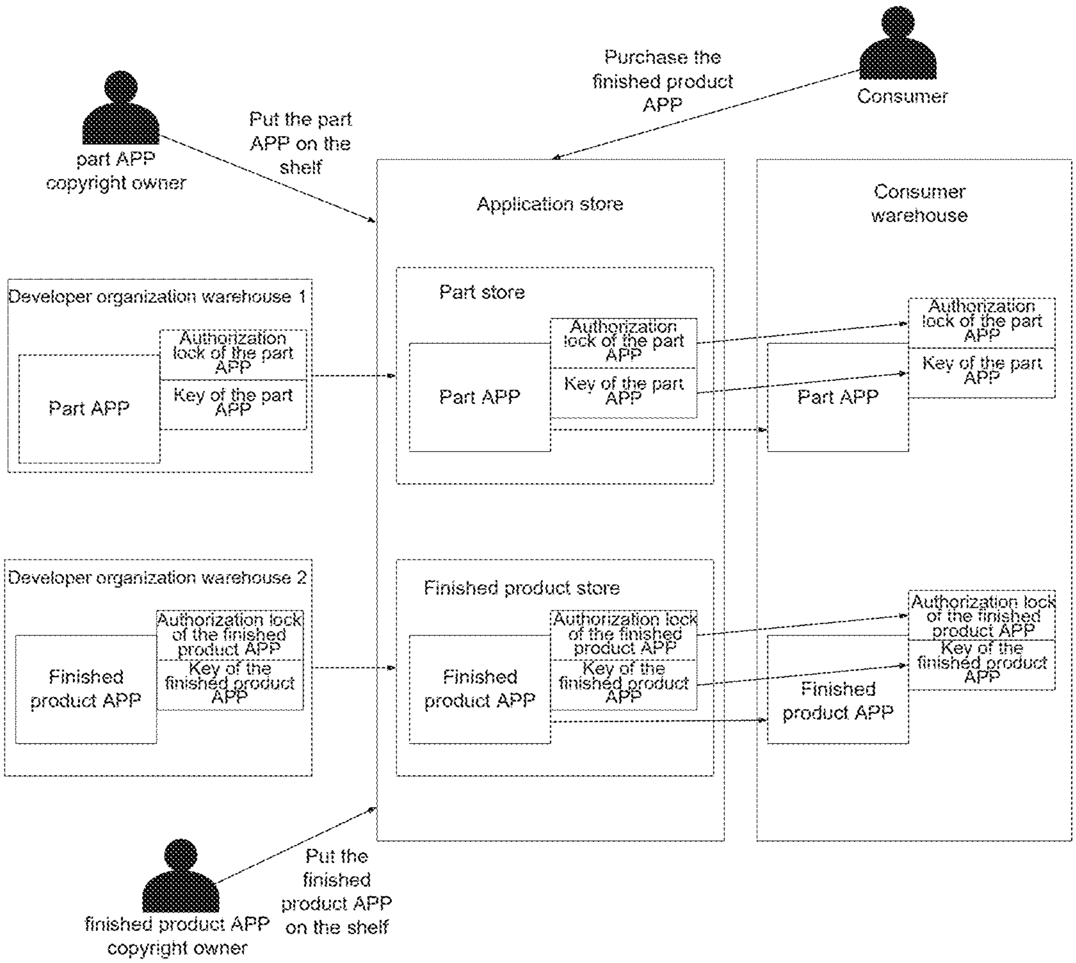
FIG. 10 is a schematic diagram of a transmission flow of keys and authorization locks of a finished product APP and a part APP provided by the embodiments of the present disclosure.

For example, FIG. 10 is a schematic diagram of a transmission flow of keys and authorization locks of a finished product APP and a part APP provided by the embodiments of the present disclosure. As shown in FIG. 10, the key and the authorization lock of the finished product APP may be put on the shelf in the application store from a developer organization warehouse 2, and the key and the authorization lock of the part APP may be put on the shelf in the application store from a developer organization warehouse 1. The application store stores predefinitions, authorization locks and keys of all finished product APPs and part APPs. In response to the authorization request, the application store may distribute the authorization locks and keys of the finished product APP and the part APP to the consumer warehouse.

In any of the above implementations, after the application store receives the authorization request, the process of acquiring the keys of the finished product APP and the part APP may include: determining the finished product APP according to the identifier of the finished product APP contained in the authorization request, and according to the first information contained in the finished product APP, determining the part APP corresponding to the first information (for example, the first information may be the identifier of the part APP); determining the authorization lock of the finished product APP according to the identifier of the finished product APP (for example, the authorization lock of the finished product APP contains the identifier of the finished product APP), and determining the authorization lock of the part APP according to the identifier of the part APP (for example, the authorization lock of the part APP contains the identifier of the part APP); and determining the key of the finished product APP according to the identifier of the finished product APP (for example, the key of the finished product APP contains the identifier of the finished product APP) and determining the key of the part APP according to the identifier of the part APP (for example, the key of the part APP contains the identifier of the part APP), or determining the key of the finished product APP according to the identifier of the authorization lock of the finished product APP (for example, the key of the finished product APP contains the identifier of the authorization lock of the finished product APP) and determining the key of the part APP according to the identifier of the authorization lock of the part APP (for example, the key of the part APP contains the identifier of the authorization lock of the part APP).

After the consumer purchases the finished product APP completely, an APP running instance may be created, the running environment (computer node) needs to be specified and computer resources (CPU, memory, network bandwidth) need to be allocated. A running instance corresponds to a copy of the APP. The operation and maintenance system first checks, in the application system warehouse, whether authorization protection is performed on the predefinitions of the finished product APP and the part APP (by judging according to the authorization locking state), and if there is the authorization protection, the operation and maintenance system checks in the application system warehouse, whether there are any spare authorization key copies of the predefinitions of the finished product APP and the part APP. If there are spare authorization key copies, the running instances of the finished product APP and the part APP are allowed to be created, and if there are no authorization key copies, the running instances of the finished product APP and the part APP cannot be created. After the APP running instance is successfully created, it will occupy a key copy. The APP operation and maintenance system will periodically detect the state of the authorization key copy occupied by the APP running instance, and if the authorization key copy expires, the running of the APP instance will be stopped. If the APP running instance is deleted, the authorization copy occupied by the APP running instance is released. The authorization state of the APP running instance affects the authorization state of its sub-APP running instance, and if the authorization of the APP running instance expires and the APP running instance stops running, the sub-APP will also stop running (regardless of the authorization state of the sub-APP).

It can be seen that in the embodiments of the present disclosure, the APP developer does not process the authorization in the APP logic, and the APP submitted by the developer does not have an authorization lock. Instead, the APP copyright owner adds the authorization lock to the APP. When developing the APP, no authorization encryption strategy is implanted inside the program, and only service functions are processed. The copyright owner performs authorization encryption on the APP when putting the APP on the shelf, which is convenient for the development organization to adjust the encryption strategy without affecting the service logic of the APP, so as to maintain the stability of the APP functions.

The authorization key of the APP authorization lock may be made by the APP copyright owner, the application store does not directly make the authorization key, and acquires the authorization key from the store of the APP copyright owner, so that how many authorization keys are issued is determined by the APP copyright owner, which can protect the permission of the APP copyright owner.

Both the finished product APP and its part APP have authorization controls. Separate authorization controls for the part APP and the finished product APP can protect the rights and interests of the copyright owner of the part APP, and improve the enthusiasm of part APP developers. When the consumer purchases the finished product APP, the store decomposes the APP layer by layer according to an internal structure of the APP, obtains the authorization of the finished product APP and all its descendant part APPs in one shot, and distributes them to the consumer's warehouse, so as to reduce the complexity of the consumer purchasing the authorization resulted by protecting the interests of developers.

It can be understood that in actual implementations, the application store, the user equipment or the like described in the embodiments of the present disclosure may contain one or more hardware structures and/or software modules for implementing the aforementioned corresponding application authorization management method, and these hardware structures and/or software modules for execution may constitute an electronic device. It shall be easily recognized by those skilled in the art that, the algorithm steps of various examples described in conjunction with the embodiments in the present disclosure, the present disclosure can be implemented in the form of hardware or a combination of hardware and computer software. Whether a certain function is performed by hardware or by computer software driving hardware, depends on a specific application and a design constraint of the technical solutions. Professional technicians may use different methods to achieve the described functions, for each specific application, but such implementation should not be considered beyond the scope of the present disclosure.

Figure 11:
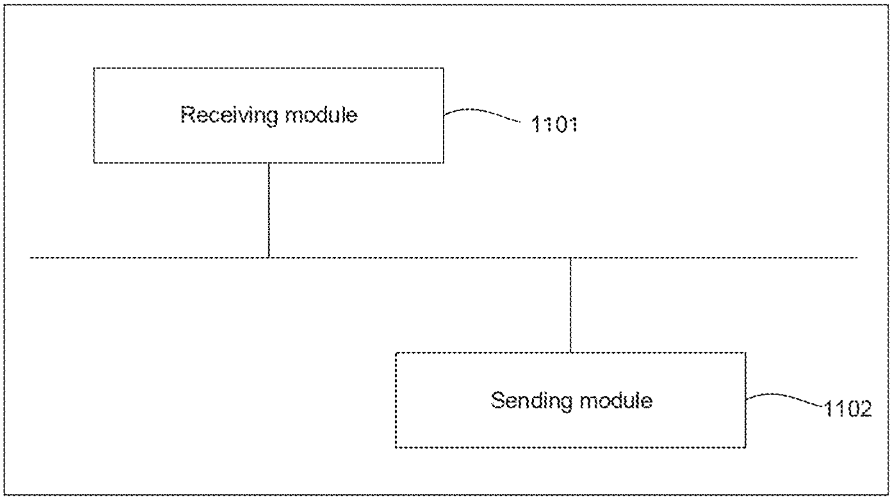
FIG. 11 is a structural schematic diagram of an application authorization management apparatus provided by the embodiments of the present disclosure.

Based on this understanding, taking hardware structures and/or software modules contained in the application store as an example, the embodiments of the present disclosure further provide an application authorization management apparatus correspondingly, that may be applied to the aforementioned application store (such as the hardware device corresponding to the application store). FIG. 11 is a structural schematic diagram of an application authorization management apparatus provided by the embodiments of the present disclosure. As shown in FIG. 11, the application authorization management apparatus may include: a receiving module 1101, configured to receive an authorization request, where the authorization request is used to request an authorization permission of a second application downloaded from an application store, the second application has an association relationship with a first application, and is able to call the first application to implement a function of the first application; a sending module 1102, configured to send a first key and a second key in response to the authorization request. Herein, the first application has a first authorization lock, the first authorization lock is used to perform authorization locking on the first application downloaded from the application store, and the first key is used to release the authorization locking on the first application. The second application has a second authorization lock, the second authorization lock is used to perform the authorization locking on the second application, and the second key is used to release the authorization locking on the second application.

Figure 12:
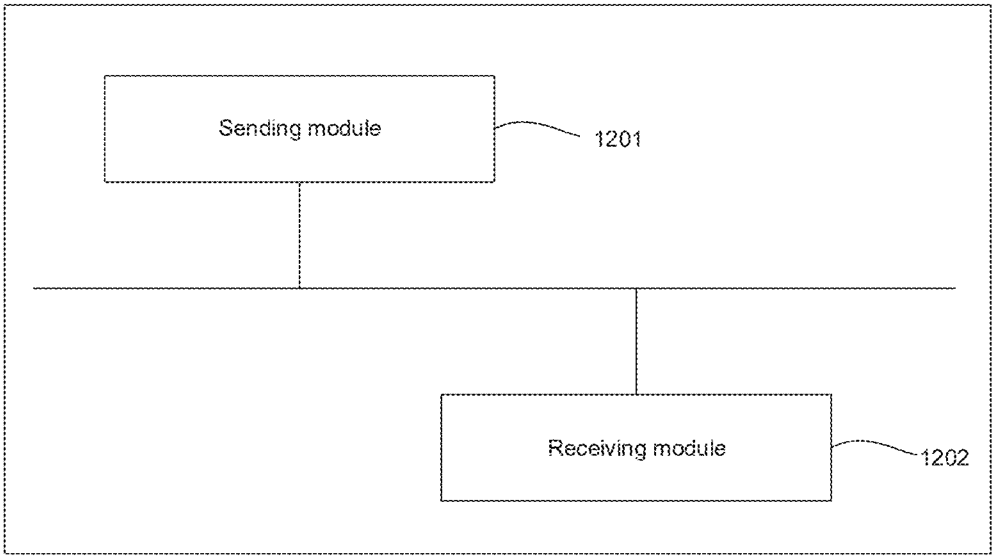
FIG. 12 is a structural schematic diagram of an application authorization management apparatus provided by the embodiments of the present disclosure.

Taking hardware structures and/or software modules contained in the user equipment as an example, the embodiments of the present disclosure further provide an application authorization management apparatus correspondingly, that may be applied to the aforementioned user equipment (such as a mobile phone, a computer, etc.). FIG. 12 is another structural schematic diagram of an application authorization management apparatus provided by the embodiments of the present disclosure. As shown in FIG. 12, the application authorization management apparatus may include: a sending module 1201, configured to send an authorization request, where the authorization request is used to request an authorization permission of a second application downloaded from an application store, the second application has an association relationship with a first application, and is able to call the first application to implement a function of the first application; a receiving module 1202, configured to receive a first key and a second key. Herein, the first application has a first authorization lock, the first authorization lock is used to perform authorization locking on the first application downloaded from the application store, and the first key is used to release the authorization locking on the first application. The second application has a second authorization lock, the second authorization lock is used to perform the authorization locking on the second application, and the second key is used to release the authorization locking on the second application.

As described above, the embodiments of the present disclosure may divide the respective execution entities involved in the application authorization management method into functional modules according to the above method examples. Herein, the above integrated modules may be implemented in the form of hardware or may be implemented in the form of software functional modules. In addition, it should also be noted that the division of modules in the embodiments of the present disclosure is schematic and only a logical functional division. There may be other division manners in actual implementations. For example, respective functions may be divided into respective functional modules correspondingly, or two or more functions may be integrated into one processing module.

Regarding the application authorization management apparatus in the above embodiments, the specific manners and the beneficial effects of respective modules thereof performing operations have been described in detail in the above method embodiments, and will not be repeated here.

The embodiments of the present disclosure further provide an electronic device, and the electronic device may be a hardware device corresponding to the application store, or the aforementioned user device. The electronic device includes a processor and a memory for storing instructions executable by the processor. The processor is configured to when executing the instructions, cause the electronic device to implement the methods as described in the aforementioned embodiments.

In exemplary embodiments, the embodiments of the present disclosure further provide a computer-readable storage medium on which computer program instructions are stored. The computer program instructions, when executed by an electronic device, cause the electronic device to implement the methods as described in the aforementioned embodiments. The computer-readable storage medium may be a non-transitory computer-readable storage medium, for example, the non-transitory computer-readable storage medium may be a read only memory (ROM), a random access memory (RAM), a compact disc read-only memory (CD-ROM), a magnetic tape, a floppy disk, and an optical data storage device, etc.

In exemplary embodiments, the embodiments of the present disclosure further provide a computer program product including computer-readable codes, or a non-volatile computer-readable storage medium carrying computer-readable codes. When the computer-readable codes are executed in an electronic device, a processor in the electronic device implements the methods as described in the aforementioned embodiments.

Those skilled in the art, after considering the specification and practicing the invention disclosed here, will easily conceive of other implementations of the present disclosure. The present disclosure is intended to cover any variations, usage, or adaptive changes of the present disclosure, and these variations, usage, or adaptive changes follow the general principles of the present disclosure and include common knowledge or customary technical means in the art, which are not disclosed in the present disclosure. The specification and the embodiments are regarded as exemplary only, and a true scope and spirit of the present disclosure are indicated by the claims as follows.

It should be understood that the present disclosure is not limited to the precise structures described above and shown in the drawings, and various modifications and changes may be made therein without departing from its scope. The scope of the present disclosure is limited by the appended claims only.

The invention claimed is:

1. An application authorization management method, wherein the method comprises:

receiving an authorization request, wherein the authorization request is used to request an authorization permission of a second application downloaded from an application store; the second application has an association relationship with a first application, and the second application is configured to call the first application to implement a function of the first application; and the second application further has an association relationship with a third application downloaded from the application store, and is configured to call the third application to implement a function of the third application; and when authorization locking is not performed on the third application, in response to the authorization request, sending a first key and a second key;

when the authorization locking is performed on the third application, in response to the authorization request, sending the first key, the second key and a third key; and wherein the first application has a first authorization lock, the first authorization lock is used to perform the authorization locking on the first application, and the first key is used to release the authorization locking on the first application; the second application has a second authorization lock, the second authorization lock is used to perform the authorization locking on the second application, and the second key is used to release the authorization locking on the second application; and the third key is used to release the authorization locking on the third application.

2. The method according to claim 1, wherein the first application comprises a first identifier, and the first identifier is used to identify that the authorization locking is performed on the first application; and the second application comprises a second identifier, and the second identifier is used to identify that the authorization locking is performed on the second application.

3. The method according to claim 1, wherein an authorization lock used for the authorization locking comprises: an authorization field, used to identify that the authorization lock has a function of controlling authorization time of an application; and a key corresponding to the authorization lock comprises: valid usage time of the key.

4. The method according to claim 1, wherein an authorization lock used for the authorization locking comprises one or more of: an identifier of an application on which the authorization locking is performed by using the authorization lock, an identifier of the authorization lock, and an authorization type; and the authorization type comprises free and paid.

5. The method according to claim 1, wherein a key corresponding to an authorization lock comprises one or more of: an identifier of the key, an identifier of the authorization lock corresponding to the key, and an identifier of an application on which the authorization locking is performed by using the authorization lock corresponding to the key.

6. The method according to claim 1, wherein the authorization locking is performed on the first application by a copyright owner of the first application using the first authorization lock; and the authorization locking is performed on the second application by a copyright owner of the second application using the second authorization lock.

7. The method according to claim 1, wherein a copyright owner of the first application and a copyright owner of the second application are the same or different.

8. The method according to claim 1, wherein a developer of the first application and a developer of the second application are the same or different.

9. The method according to claim 1, wherein the second application comprises first information, and the first information is used to indicate the first application associated with the second application; and the first information comprises an identifier of the first application; and different applications in the application store have different identifiers.

10. A non-transitory computer-readable storage medium, comprising a computer program, wherein the computer program, when running on an electronic device, causes the electronic device to implement the method according to claim 1.

11. An application authorization management method, wherein the method comprises:

sending an authorization request, wherein the authorization request is used to request an authorization permission of a second application downloaded from an application store; the second application has an association relationship with a first application, and the second application is configured to call the first application to implement a function of the first application; and the second application further has an association relationship with a third application downloaded from the application store, and is configured to call the third application to implement a function of the third application; and when authorization locking is not performed on the third application, receiving a first key and a second key;

when the authorization locking is performed on the third application, receiving the first key, the second key and a third key; and wherein the first application has a first authorization lock, the first authorization lock is used to perform the authorization locking on the first application, and the first key is used to release the authorization locking on the first application; the second application has a second authorization lock, the second authorization lock is used to perform the authorization locking on the second application, and the second key is used to release the authorization locking on the second application; and the third key is used to release the authorization locking on the third application.

12. The method according to claim 11, wherein the first application comprises a first identifier, and the first identifier is used to identify that the authorization locking is performed on the first application; and the second application comprises a second identifier, and the second identifier is used to identify that the authorization locking is performed on the second application.

13. The method according to claim 11, wherein an authorization lock used for the authorization locking comprises: an authorization field, used to identify that the authorization lock has a function of controlling authorization time of an application; and a key corresponding to the authorization lock comprises: valid usage time of the key.

14. The method according to claim 11, wherein an authorization lock used for the authorization locking comprises one or more of: an identifier of an application on which the authorization locking is performed by using the authorization lock, an identifier of the authorization lock, and an authorization type; and the authorization type comprises free and paid.

15. The method according to claim 11, wherein a key corresponding to an authorization lock comprises one or more of: an identifier of the key, an identifier of the authorization lock corresponding to the key, and an identifier of an application on which the authorization locking is performed by using the authorization lock corresponding to the key.

16. The method according to claim 11, wherein the second application comprises first information, and the first information is used to indicate the first application associated with the second application; and the first information comprises an identifier of the first application.

17. An electronic device, comprising a processor, a memory and a computer program, wherein the computer program is stored on the memory, and the computer program, when executed by the processor, causes the electronic device to implement the method according to claim 11.

18. An electronic device, comprising a processor, a memory and a computer program, wherein the computer program is stored on the memory, and the computer program, when executed by the processor, causes the electronic device to implement:

receiving an authorization request, wherein the authorization request is used to request an authorization permission of a second application downloaded from an application store; the second application has an association relationship with a first application, and the second application is configured to call the first application to implement a function of the first application; and the second application further has an association relationship with a third application downloaded from the application store, and is configured to call the third application to implement a function of the third application; and when authorization locking is not performed on the third application, in response to the authorization request, sending a first key and a second key;

when the authorization locking is performed on the third application, in response to the authorization request, sending the first key, the second key and a third key; and wherein the first application has a first authorization lock, the first authorization lock is used to perform the authorization locking on the first application, and the first key is used to release the authorization locking on the first application; the second application has a second authorization lock, the second authorization lock is used to perform the authorization locking on the second application, and the second key is used to release the authorization locking on the second application; and the third key is used to release the authorization locking on the third application.

* * * * *